United States Patent
Hu et al.

(10) Patent No.: US 12,242,734 B2
(45) Date of Patent: Mar. 4, 2025

(54) MEMORY PATTERN MANAGEMENT FOR IMPROVED DATA RETENTION IN MEMORY DEVICES

(71) Applicant: Micron Technology, Inc., Boise, ID (US)

(72) Inventors: Guang Hu, Mountain View, CA (US); Ting Luo, Santa Clara, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/237,668

(22) Filed: Aug. 24, 2023

(65) Prior Publication Data

US 2024/0086079 A1 Mar. 14, 2024

Related U.S. Application Data

(60) Provisional application No. 63/405,069, filed on Sep. 9, 2022.

(51) Int. Cl.
*G06F 3/06* (2006.01)
(52) U.S. Cl.
CPC .......... *G06F 3/0619* (2013.01); *G06F 3/0634* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,564,233 B1* | 2/2017 | Cho | G11C 11/5628 |
| 2017/0194062 A1* | 7/2017 | Main | G11C 16/26 |
| 2019/0004734 A1* | 1/2019 | Kirshenbaum | G06F 3/0679 |
| 2019/0043565 A1* | 2/2019 | Miccoli | G11C 11/5642 |
| 2020/0356307 A1* | 11/2020 | Subbarao | G11C 16/10 |

* cited by examiner

*Primary Examiner* — Tracy C Chan
(74) *Attorney, Agent, or Firm* — Lowenstein Sandler LLP

(57) ABSTRACT

A system comprises a memory device including a plurality of management units and a processing device. The processing device is operatively coupled with the memory device and configured to place the plurality of management units into a first protective state by erasing the plurality of management units, identify a cursor satisfying a cursor definition, identify a subset of the plurality of management units based on a location, on the memory device, referenced by the cursor, and place a selected management unit of the subset of the plurality of management units into a second protective state by programming a protective data pattern to the selected management unit.

20 Claims, 11 Drawing Sheets

MEMORY PATTERN MANAGEMENT FOR IMPROVED DATA RETENTION IN MEMORY DEVICES

CROSS REFERENCE TO RELATED APPLICATIONS

This application claims the benefit of priority under 35 U.S.C. § 119 to U.S. Provisional Patent Application No. 63/405,069, filed Sep. 9, 2022, which is hereby incorporated by reference herein in its entirety.

TECHNICAL FIELD

Embodiments of the disclosure relate generally to memory sub-systems, and more specifically, to memory pattern management for improved data retention in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
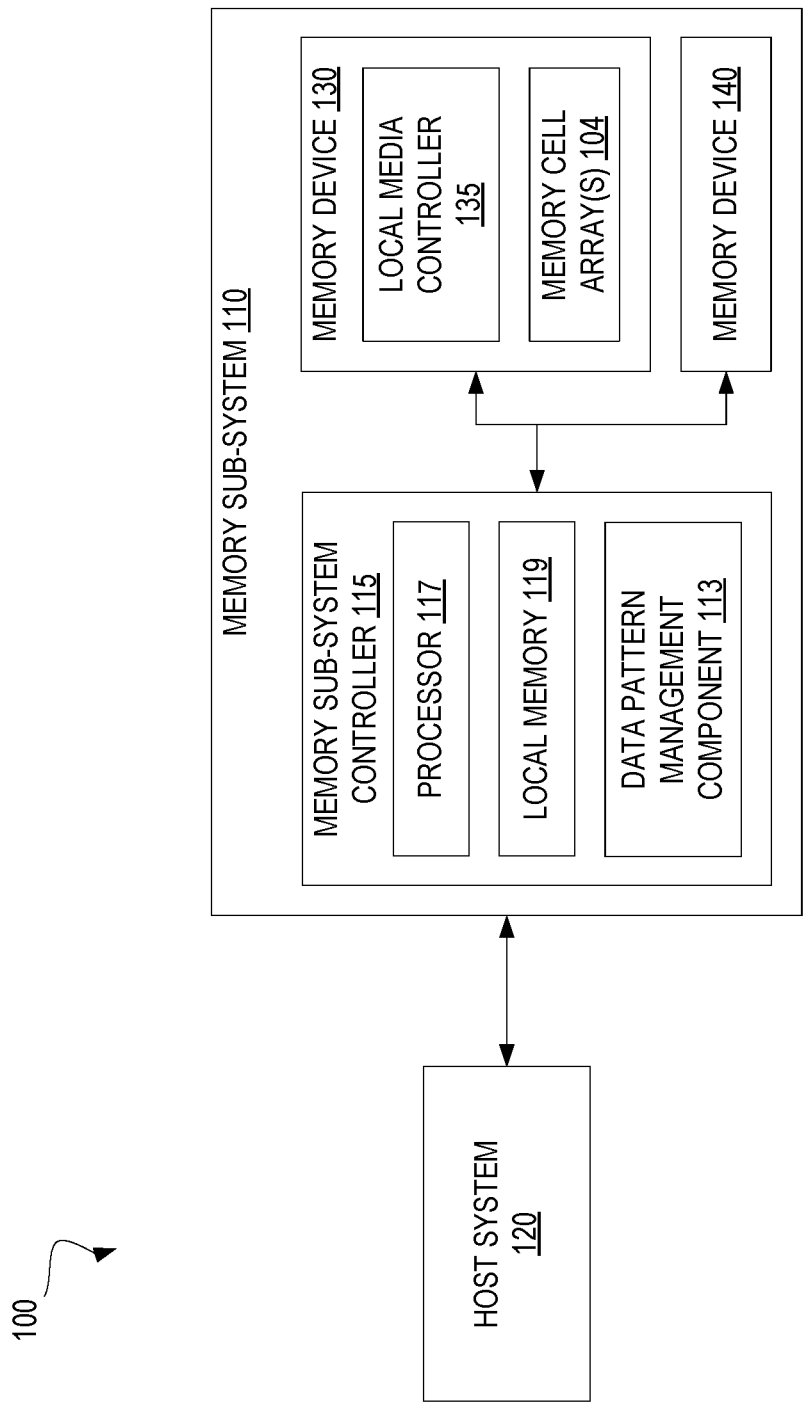
FIG. 1A illustrates an example computing system that includes a memory sub-system in accordance with some embodiments of the present disclosure.

Aspects of the present disclosure are directed to memory pattern management for improved data retention in memory devices. A memory sub-system can include one or more storage devices, memory modules, or a combination of storage devices and memory modules. Examples of storage devices and memory modules are described below in conjunction with FIGS. 1A-1B. In general, a host system can utilize a memory sub-system that includes one or more memory components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store data (e.g., provided by a host system). In some embodiments, non-volatile memory devices can be provided by negative-and (NAND) type flash memory devices. Other examples of non-volatile memory devices are described below in conjunction with FIGS. 1A-1B.

A non-volatile memory device is a package of one or more dice. Each die can include one or more planes (i.e., a portion of the memory device that includes multiple memory cells). Some memory devices can include two or more planes. For some types of non-volatile memory devices (e.g., NAND devices), each plane includes a set of blocks. A "block" can refer to a unit of the memory device used to store data and can include a group of memory cells. Each block can include a set of contiguous or non-contiguous pages. Each page includes a set of memory cells. An example of a "block" is an "erasable block," which is the minimal erasable unit of memory, while "page" is a minimal writable unit of memory.

A memory cell is an electronic circuit that stores information. A memory cell can include a charge storage node that holds an electric charge and a transistor that acts as a switch controlling access to the charge storage node. The memory cells of a memory device can be arranged in a two-dimensional grid (i.e., in an array of columns and rows) or a three-dimensional grid (i.e., with multiple vertically-stacked layers).

An electric charge can be selectively placed on the memory cells in a memory device (e.g., by applying a programming voltage), which in turn, can affect a threshold voltage for each memory cell. Multiple logical states (or programming levels) can be established into which a memory cell can be placed (i.e., by precisely controlling the amount of electric charged stored by the memory cell). The particular logical state of a memory cell can be determined by comparing the measured threshold voltage exhibited by the memory cell (e.g., after it has been programmed) to one or more reference voltage levels (i.e., that separate the various logical states). In this way, the memory cell can carry one or more bits of information. A triple level cell (TLC), for example, may be placed into eight different logical states (Level 0 to Level 8, or L0 to L8) each representing 3 bits of data ("111", "110", "101", "100", "011", "010", "001", "000" respectively). The lowest logical state (e.g., L0) is frequently referred to as an "erase" state.

In order to permit discrimination between logical states, a minimum "read window" must be maintained between the threshold voltage distributions of each logical state. The aggregate total of all read windows is referred to as a "read window budget" of the memory device. The read window budget of a memory device, however, can change over its lifetime, including throughout a production process involving the memory device. For example, as part of a production process, a memory device may be integrated within a storage device (e.g., a Universal Flash Storage (UFS) drive, an embedded Multi-Media Controller (eMMC) drive, etc.), which in turn, may be integrated into a computing system (e.g., a mobile phone). As part of the production process, the memory cells of a memory device may be subjected to high temperatures (e.g., during an infrared (IR) reflow process in which the memory device is integrated into a storage device, or in which the storage device is integrated into a computing system) and/or long periods of storage (e.g., before the memory device is integrated into a storage device, or before the storage device is integrated into a computing system), which may result in degradation to the memory cells with a concomitant reduction in the read window budget of the memory device.

Memory devices may be designed with regard to this reduced read window budget. Memory device specifications, for example, may specify performance characteristics that a memory device must possess at the end of the production process (i.e., the "beginning of life" of the computing system into which it may be integrated). A memory device specification, for example, may specify a beginning of life data retention requirement for the memory device under which data must be reliably stored (e.g., 3 years at 40 degrees Celsius without any resulting bit errors). This data retention requirement, in turn, imposes a minimum read window budget requirement for the memory device.

The read window budget of a memory device, however, places a constraint on other aspects of memory device performance. The read window budget, for example, dictates the precision with which a charge is to be placed on a memory cell (i.e., in terms of a threshold voltage distribution width), for example, through a programming or erase operation. A larger read window budget, for example, may lead to narrower threshold voltage distributions, whereas a smaller read window budget permits wider threshold voltage distributions. But the more precise an operation must be, the more time is required to perform the operation. A tradeoff, thus, must be made between aggressive programming and erase times and smaller read window budgets (and improved data retention properties).

Aspects of the present disclosure address the above and other deficiencies by placing a protective data pattern onto a memory device and maintaining the protective data pattern throughout the production process. The protective data pattern may place the memory cells into a state that is close to their neutral threshold voltage, thereby minimizing the amount of stress placed on the memory cells. Placing and maintaining the protective data pattern, thus, operates to minimize the amount of degradation experienced by the memory cells of the memory device. In some embodiments, memory cells of a memory device are placed and maintained in a TLC Level 2 state, where the charge carried by the cell is similar to a Level 2 state of a TLC memory cell. Memory cells that are placed and maintained in the TLC Level 2 state undergo less degradation during the production process (i.e., when subjected to high temperatures and/or long periods of storage) than they would otherwise (e.g., if maintained in some other state, such as a Level 0 state). Complicating matters, however, is the fact that production processes can involve a number of testing and qualification procedures, which may alter the state of a memory cell. Embodiments of the present disclosure, thus, look to maintain a Solid Level 2 (or SL2) pattern (i.e., where all (or nearly all) memory cells are in a TLC Level 2 state) throughout the production process, particularly before the memory cells experience long periods of storage and/or exposure to high temperatures. By reducing the amount of degradation experienced by the memory cell, the post-production read window budget of a memory device can be significantly improved. This improvement to the read window budget may allow for more aggressive programming and erase times and/or improved data retention characteristics, as well as other performance improvements that can be derived from an improved read window budget.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can include a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells 137. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 ("controller") can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115, for example, may employ a Flash Translation Layer (FTL) to translate logical addresses to corresponding physical memory addresses, which can be stored in one or more FTL mapping tables. In some instances, the FTL mapping table can be referred to as a logical-to-physical (L2P) mapping table storing L2P mapping information. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 can include a data pattern management component 113 that can be used to place and maintain a protective data pattern on memory device 130 (i.e., by programming and/or erasing memory cells 137). The protective data pattern may place the memory cells into a state that is close to their neutral threshold voltage, such that the amount of stress placed on the memory cells, and consequently damage experienced by the memory cells, is minimized. In some embodiments, for example, the data pattern management component 113 can be used to place and maintain a Solid Level 2 (SL2) pattern on memory device 130, i.e., where all (or nearly all) of the memory cells of memory device 130 are in a TLC Level 2 state. That is, the charge carried by all of the memory cells, regardless of their type (i.e., SLC, MLC, TLC, etc.), is similar to a Level 2 state of a TLC memory cell. In some embodiments, for instance, the data pattern management component 113 may be configured to perform a program operation to place particular memory cells into the TLC Level 2 state. A program operation, however, is typically only capable of programming a single page of memory cells at a time. Accordingly, in some embodiments, the data pattern management component 113 may be configured to perform a "special erase" operation that is capable of placing an entire block of memory cells into a TLC Level 2 state. In this way, placing the protective data pattern on the entire memory device may be performed more efficiently. In some embodiments, the "special erase" operation may be performed using a relatively low voltage, when compared to a traditional erase operation (e.g., that would place the memory cells into a TLC Level 0 state), which may be closer to the neutral threshold voltage of the memory cells. While a program operation may affect a more precise TLC Level 2 programming (i.e., with a narrower threshold voltage distribution) compared to the special erase operation, the added precision only provides an incremental benefit to the post-production read window budget of the memory device, and the threshold voltage distribution affected by the special erase operation is still able to adequately protect the memory cells of the memory device.

In certain situations, it may not be possible to employ a "special erase" operation. A "special erase" operation, for example, may not be used where the memory cells are expected to be programmable, e.g., with host data, immediately thereafter (i.e., without first placing the memory cells into a lower threshold voltage state, for example, through a traditional erase operation). Accordingly, in some embodiments, the data pattern management component 113 may be configured to perform an SLC erase operation, in which the memory cells are programmed to a SLC Level 0 state, instead of TLC erase operation, in which the memory cells are placed into a much deeper erase state (i.e., TLC a Level 0 state). In doing so, the memory cells may be afforded at least some protection, and an improved read window budget may be realized.

In some embodiments, as illustrated in FIG. 1A, the memory sub-system controller 115 includes at least a portion of the data pattern management component 113. In some embodiments, the data pattern management component 113 is part of the host system 120 (e.g., as an application, or an operating system running thereon). In some embodiments, local media controller 135 includes at least a portion of data pattern management component 113 and is configured to perform the functionality described herein. In some embodiments, at least a portion of the data pattern management component 113 may be part of an external system that is configured to perform the functionality described herein. The data pattern management component 113, for example, may be part of a wafer probe, or testing apparatus used in a production process involving memory device 130, as described in the examples below.

Figure 1B:
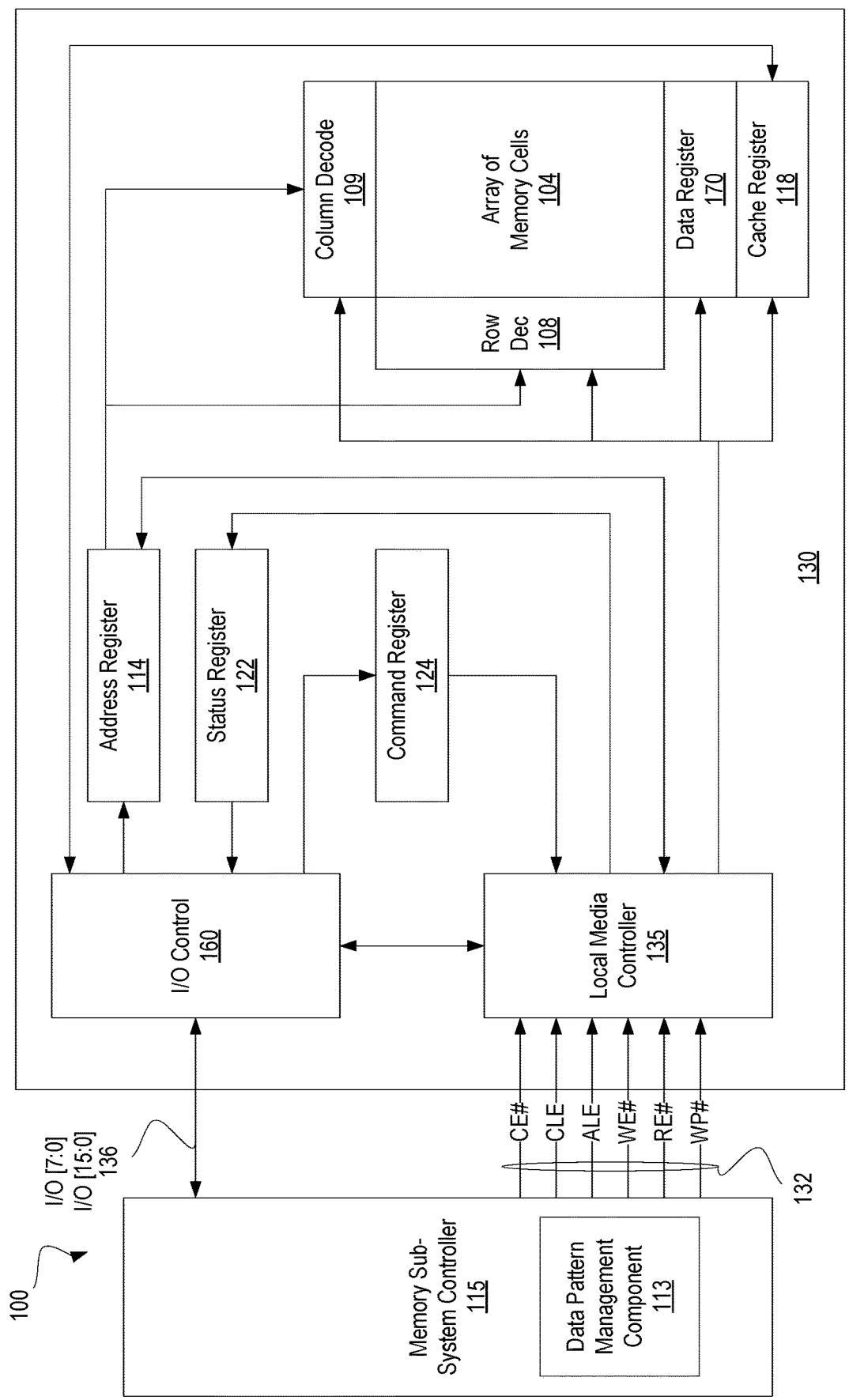
FIG. 1B illustrates a block diagram of a memory device in communication with a memory sub-system in accordance with some embodiments of the present disclosure.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A) in accordance with some embodiments of the present disclosure.

Memory device 130 includes an array of memory cells 104 logically arranged in rows and columns. Memory cells of a logical row are typically connected to the same access line (e.g., a wordline) while memory cells of a logical column are selectively connected to the same data line (e.g., a bitline). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115. That is, the local media controller 135 is configured to perform access operations (e.g., read operations, write operations and/or erase operations) on the array of memory cells 104. The local media controller 135 is in communication with row decode circuitry 108 and column decode circuitry 109 to control the row decode circuitry 108 and column decode circuitry 109 in response to the addresses.

The local media controller 135 is also in communication with a cache register 118. Cache register 118 latches data, either incoming or outgoing, as directed by the local media controller 135 to temporarily store data while the array of memory cells 104 is busy writing or reading, respectively, other data. During a program operation, data may be passed from the cache register 118 to the data register 170 for transfer to the array of memory cells 104; then new data may be latched in the cache register 118 from the I/O control circuitry 160. During a read operation, data may be passed from the cache register 118 to the I/O control circuitry 160 for output to the memory sub-system controller 115; then new data may be passed from the data register 170 to the cache register 118. The cache register 118 and/or the data register 170 may form a portion of a page buffer of the memory device 130. A page buffer may further include sensing devices (not shown in FIG. 1B) to sense a data state of a memory cell of the array of memory cells 204 (e.g., by sensing a state of a data line connected to that memory cell). A status register 122 may be in communication with I/O control circuitry 160 and the local memory controller 135 to latch the status information for output to the memory sub-system controller 115.

Memory device 130 receives control signals from the memory sub-system controller 115 at the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands may be received over input/output (I/O) pins [7:0] of I/O bus 136 at I/O control circuitry 160 and may then be written into command register 124. The addresses may be received over input/output (I/O) pins [7:0] of I/O bus 136 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 118. The data may be subsequently written into data register 170 for programming the array of memory cells 104.

In an embodiment, cache register 118 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided and that the memory device 130 of FIGS. 1A-1B has been simplified. It should also be recognized that the functionality of the various block components described with reference to FIGS. 1A-1B need not be segregated to distinct components or component portions of an integrated circuit device. For example, a single component or component portion of an integrated circuit device could be adapted to perform the functionality of more than one block component of FIGS. 1A-1B. Similarly, one or more components or component portions of an integrated circuit device could be combined to perform the functionality of a single block component of FIGS. 1A-1B. Additionally, while specific I/O pins are described in accordance with popular conventions for receipt and output of the various signals, it is noted that other combinations or numbers of I/O pins (or other I/O node structures) may be used in the various embodiments.

Figure 2A:
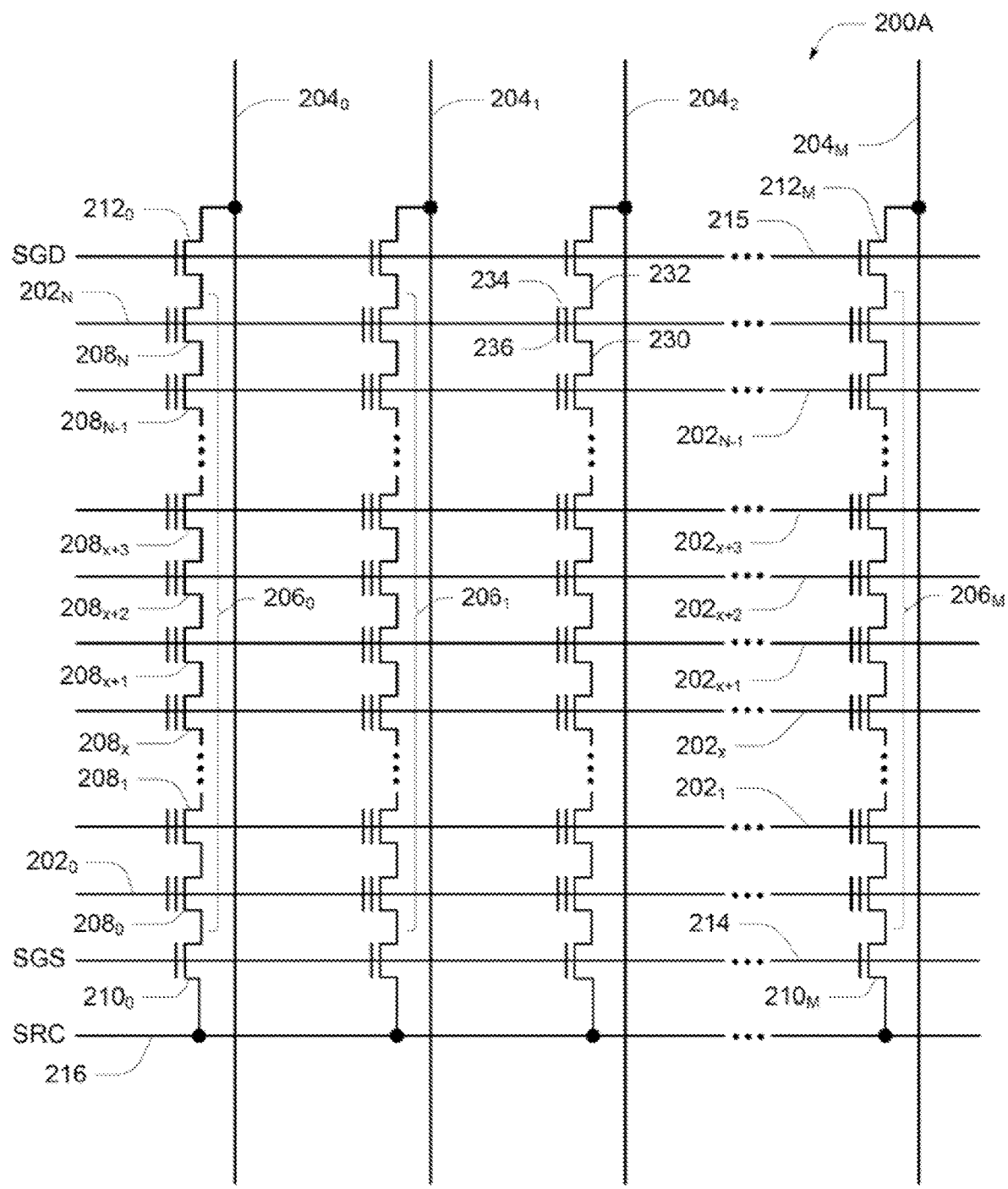
FIG. 2A illustrates a portion of an example array of memory cells that can be included in a memory device in accordance with some embodiments of the present disclosure.

FIG. 2A illustrates a portion of an array of memory cells 200A that could be included in a memory device (e.g., as a portion of memory cells 104) in accordance with some embodiments of the present disclosure. Memory array 200A includes access lines, such as word lines $202_0$ to $202_N$, and data lines, such as bitlines $204_0$ to $204_M$. The word lines 202 can be connected to global access lines (e.g., global word lines), not shown in FIG. 2A, in a many-to-one relationship. For some embodiments, memory array 200A can be formed over a semiconductor that, for example, can be conductively doped to have a conductivity type, such as a p-type conductivity, e.g., to form a p-well, or an n-type conductivity, e.g., to form an n-well.

Memory array 200A can be arranged in rows (each corresponding to a word line 202) and columns (each corresponding to a bitline 204). Each column can include a string of series-connected memory cells (e.g., non-volatile memory cells), such as one of NAND strings $206_0$ to $206_M$. Each NAND string 206 can be connected (e.g., selectively connected) to a common source (SRC) 216 and can include memory cells $208_0$ to $208_N$. The memory cells 208 can represent non-volatile memory cells for storage of data. The memory cells 208 of each NAND string 206 can be connected in series between a select gate 210 (e.g., a field-effect transistor), such as one of the select gates $210_0$ to $210_M$ (e.g., that can be source select transistors, commonly referred to as select gate source), and a select gate 212 (e.g., a field-effect transistor), such as one of the select gates $212_0$ to $212_M$ (e.g., that can be drain select transistors, commonly referred to as select gate drain). Select gates $210_0$ to $210_M$ can be commonly connected to a select line 214, such as a source select line (SGS), and select gates $212_0$ to $212_M$ can be commonly connected to a select line 215, such as a drain select line (SGD). Although depicted as traditional field-effect transistors, the select gates 210 and 212 can utilize a structure similar to (e.g., the same as) the memory cells 208. The select gates 210 and 212 can represent a number of select gates connected in series, with each select gate in series configured to receive a same or independent control signal.

A source of each select gate 210 can be connected to common source 216. The drain of each select gate 210 can be connected to a memory cell $208_0$ of the corresponding NAND string 206. For example, the drain of select gate $210_0$ can be connected to memory cell $208_0$ of the corresponding NAND string $206_0$. Therefore, each select gate 210 can be configured to selectively connect a corresponding NAND string 206 to the common source 216. A control gate of each select gate 210 can be connected to the select line 214.

The drain of each select gate 212 can be connected to the bitline 204 for the corresponding NAND string 206. For example, the drain of select gate $212_0$ can be connected to the bitline $204_0$ for the corresponding NAND string $206_0$. The source of each select gate 212 can be connected to a memory cell $208_N$ of the corresponding NAND string 206.

For example, the source of select gate $212_0$ can be connected to memory cell $208_N$ of the corresponding NAND string $206_0$. Therefore, each select gate 212 can be configured to selectively connect a corresponding NAND string 206 to the corresponding bitline 204. A control gate of each select gate 212 can be connected to select line 215.

The memory array 200A in FIG. 2A can be a quasi-two-dimensional memory array and can have a generally planar structure, e.g., where the common source 216, NAND strings 206 and bitlines 204 extend in substantially parallel planes. Alternatively, the memory array 200A in FIG. 2A can be a three-dimensional memory array, e.g., where NAND strings 206 can extend substantially perpendicular to a plane containing the common source 216 and to a plane containing the bitlines 204 that can be substantially parallel to the plane containing the common source 216.

Typical construction of memory cells 208 includes a data-storage structure 234 (e.g., a floating gate, charge trap, and the like) that can determine a data state of the memory cell (e.g., through changes in threshold voltage), and a control gate 236, as shown in FIG. 2A. The data-storage structure 234 can include both conductive and dielectric structures while the control gate 236 is generally formed of one or more conductive materials. In some cases, memory cells 208 can further have a defined source/drain (e.g., source) 230 and a defined source/drain (e.g., drain) 232. The memory cells 208 can have their control gates 236 connected to (and in some cases can form) a word line 202.

A column of the memory cells 208 can be a NAND string 206 or a number of NAND strings 206 selectively connected to a given bitline 204. A row of the memory cells 208 can be memory cells 208 commonly connected to a given word line 202. A row of memory cells 208 can, but need not, include all the memory cells 208 commonly connected to a given word line 202. Rows of the memory cells 208 can be divided into one or more groups of physical pages of memory cells 208. Physical pages of the memory cells 208 can include every other memory cell 208 commonly connected to a given word line 202. For example, the memory cells 208 commonly connected to word line $202_N$ and selectively connected to even bitlines 204 (e.g., bitlines $204_0$, $204_2$, $204_4$, etc.) can be one physical page of the memory cells 208 (e.g., even memory cells) while memory cells 208 commonly connected to word line $202_N$ and selectively connected to odd bitlines 204 (e.g., bitlines $204_1$, $204_3$, $204_5$, etc.) can be another physical page of the memory cells 208 (e.g., odd memory cells).

Although bitlines $204_3$-$204_5$ are not explicitly depicted in FIG. 2A, it is apparent from the figure that the bitlines 204 of the array of memory cells 200A can be numbered consecutively from bitline $204_0$ to bitline $204_M$. Other groupings of the memory cells 208 commonly connected to a given word line 202 can also define a physical page of memory cells 208. For certain memory devices, all memory cells commonly connected to a given word line can be deemed a physical page of memory cells. The portion of a physical page of memory cells (which, in some embodiments, could still be the entire row) that is read during a single read operation or programmed during a single write operation (e.g., an upper or lower page of memory cells) can be deemed a logical page of memory cells. A block of memory cells can include those memory cells that are configured to be erased together, such as all memory cells connected to word lines $202_0$-$202_N$ (e.g., all NAND strings 206 sharing common word lines 202). Unless expressly distinguished, a reference to a page of memory cells herein refers to the memory cells of a logical page of memory cells. Although the example of FIG. 2A is discussed in conjunction with NAND flash, the embodiments and concepts described herein are not limited to a particular array architecture or structure, and can include other structures (e.g., SONOS, phase change, ferroelectric, etc.) and other architectures (e.g., AND arrays, NOR arrays, etc.).

Figure 2B:
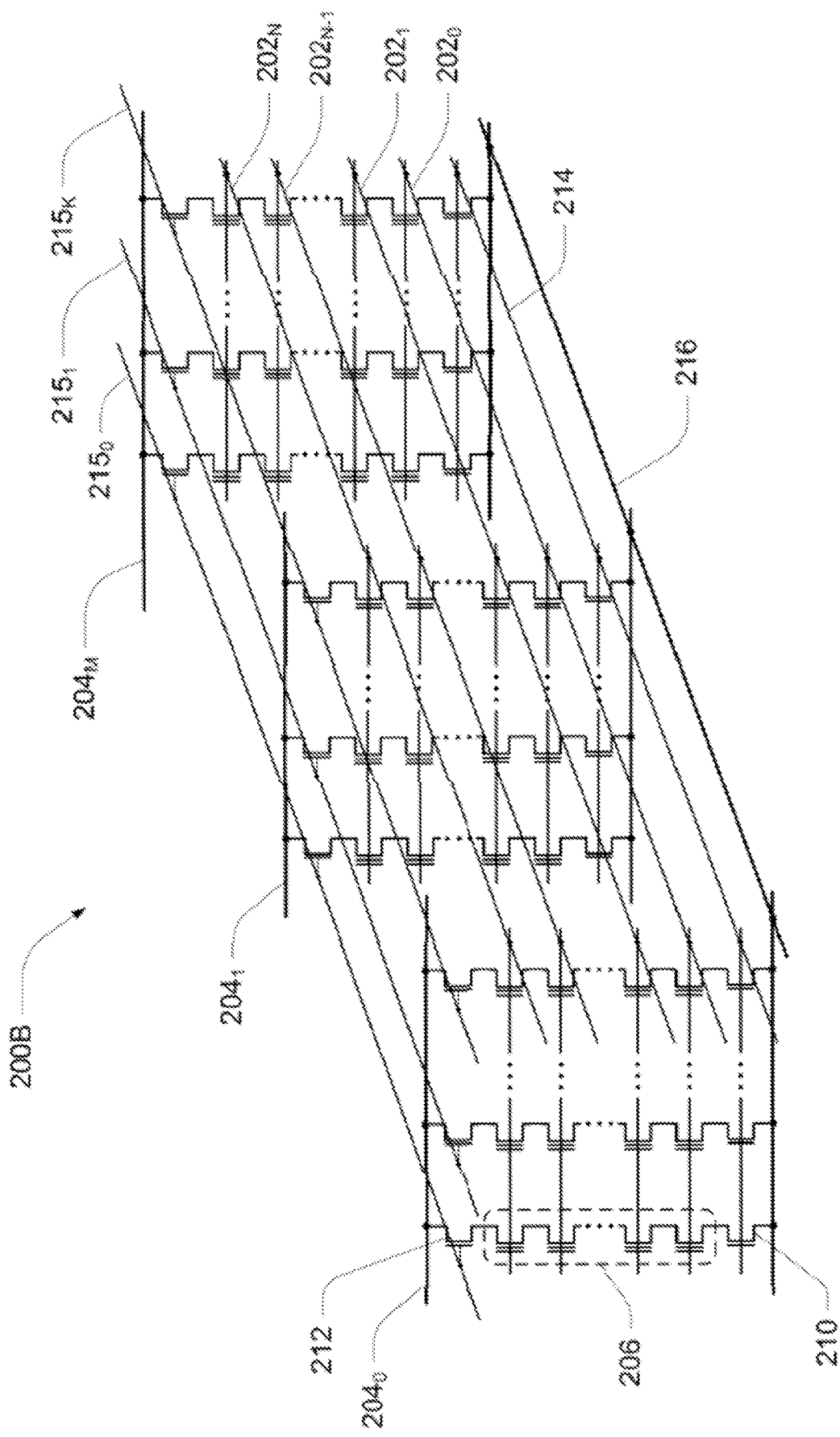
FIG. 2B illustrates a portion of another example array of memory cells that can be included in a memory device in accordance with some embodiments of the present disclosure.

FIG. 2B illustrates a portion of another array of memory cells 200B that could be included in a memory device (e.g., as a portion of memory cells 104) in accordance with some embodiments of the present disclosure. Like numbered elements in FIG. 2B correspond to the description as provided with respect to FIG. 2A. FIG. 2B provides additional detail of one example of a three-dimensional NAND memory array structure. The three-dimensional NAND memory array 200B can incorporate vertical structures which can include semiconductor pillars where a portion of a pillar can act as a channel region of the memory cells of NAND strings 206. The NAND strings 206 can be each selectively connected to a bitline $204_0$-$204_M$ by a select transistor 212 (e.g., that can be drain select transistors, commonly referred to as select gate drain) and to a common source 216 by a select transistor 210 (e.g., that can be source select transistors, commonly referred to as select gate source). Multiple NAND strings 206 can be selectively connected to the same bitline 204. Subsets of NAND strings 206 can be connected to their respective bitlines 204 by biasing the select lines $215_0$-$215_K$ to selectively activate particular select transistors 212 each between a NAND string 206 and a bitline 204. The select transistors 210 can be activated by biasing the select line 214. Each word line 202 can be connected to multiple rows of memory cells of the memory array 200B. Rows of memory cells that are commonly connected to each other by a particular word line 202 can collectively be referred to as tiers.

Figure 2C:
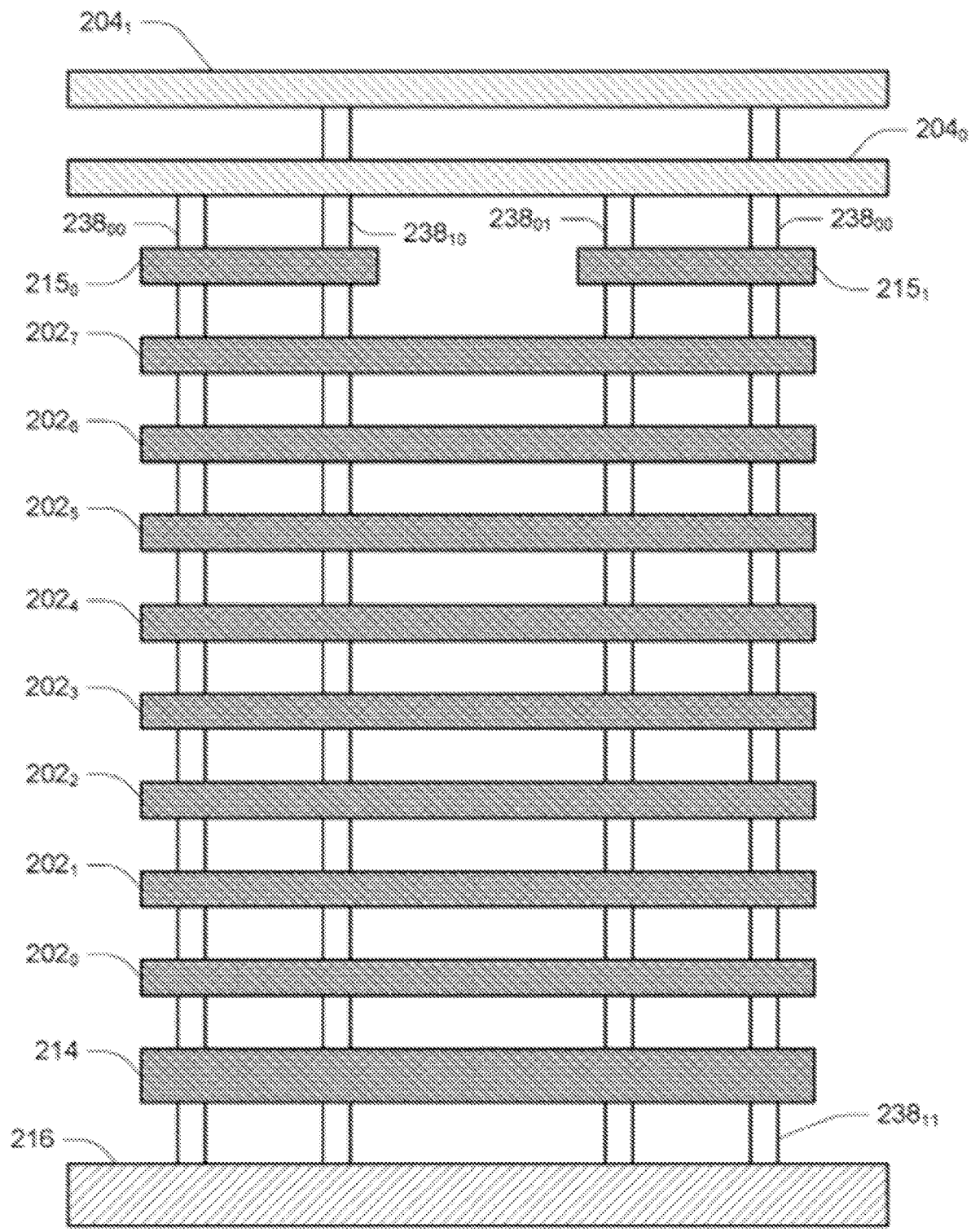
FIG. 2C illustrates a portion of yet another example array of memory cells that can be included in a memory device in accordance with some embodiments of the present disclosure.

FIG. 2C illustrates a portion of yet another array of memory cells 200C that could be included in a memory device (e.g., as a portion of memory cells 104) in accordance with some embodiments of the present disclosure. Like numbered elements in FIG. 2C correspond to the description as provided with respect to FIG. 2A. Channel regions (e.g., semiconductor pillars) $238_{00}$ and $238_{01}$ represent the channel regions of different strings of series-connected memory cells (e.g., NAND strings 206 of FIGS. 2A-2B) selectively connected to the bitline $204_0$. Similarly, channel regions $238_{10}$ and $238_{11}$ represent the channel regions of different strings of series-connected memory cells (e.g., NAND strings 206 of FIGS. 2A-2B) selectively connected to the bitline $204_1$. A memory cell (not depicted in FIG. 2C) may be formed at each intersection of an wordline 202 and a channel region 238, and the memory cells corresponding to a single channel region 238 may collectively form a string of series-connected memory cells (e.g., a NAND string 206 of FIGS. 2A-2B). Additional features might be common in such structures, such as dummy wordlines, segmented channel regions with interposed conductive regions, etc.

Figure 3A:
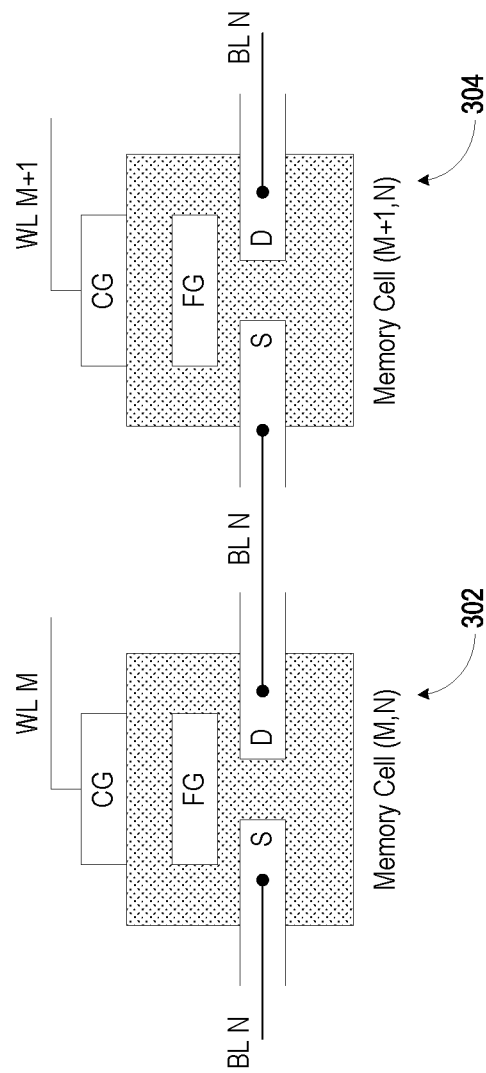
FIG. 3A illustrates a pair of memory cells as may be arranged in a memory device in accordance with some embodiments of the present disclosure.

FIG. 3A illustrates a pair of memory cells as may be arranged in a memory device in accordance with some embodiments of the present disclosure. As illustrated in FIG. 3A, a memory cell of a memory device can include a transistor, such as metal-oxide-semiconductor field effect transistor (MOSFET), having a source (S) electrode and a drain (D) electrode to pass electric current there through. The source and drain electrodes can be connected to a conductive bitline (BL), which can be shared by multiple memory cells. A memory device can include an array or memory cells that are connected to a plurality of wordlines (WL) and a plurality of bitlines (BL). A memory device can further include circuitry for selectively coupling WLs and BLs to voltage sources providing control gate and source-drain signals.

Referring again to FIG. 3A, memory cells 302 and 304 can be connected to the same bitline N and two different conductive wordlines, M and M+1, respectively. A memory cell can further have a control gate (CG) electrode to receive a voltage signal $V_{CG}$ to control the magnitude of electric current flowing between the source electrode and the drain electrode. More specifically, there can be a threshold control gate voltage $V_T$ (herein also referred to as "threshold voltage" or simply as "threshold") such that for $V_{CG}<V_T$, the source-drain electric current can be low, but which can increase substantially once the control gate voltage has exceeded the threshold voltage, $V_{CG}>V_T$. Transistors of the same memory device can be characterized by a distribution of their threshold voltages, $P(V_T)=dW/dV_T$, so that $dW=P(V_T)dV_T$ represents the probability that any given transistor has its threshold voltage within the interval $[V_T, V_T+dV_T]$.

The memory cell can also include a charge storage node (e.g., a floating fate (FG)) that can be electrically isolated from the control gate, the source electrode, and the drain electrode by insulating layers (depicted as the dotted region in FIG. 3A). In response to an appropriately chosen positive (i.e., relative to a source potential) control gate voltage $V_{CG}$, the charge storage node can receive an electric charge Q, which can be permanently stored thereon even after power to the memory cell—and, consequently, the source-drain current—has ceased. The charge Q can affect a distribution of threshold voltages $P(V_T, Q)$. Generally, the presence of the electric charge Q shifts the distribution of threshold voltages towards higher voltages, compared with the distribution $P(V_T)$ for an uncharged charge storage node. This happens because a stronger positive control gate voltage $V_{CG}$ can be needed to overcome a negative potential of the charge storage node charge Q.

Figure 3B:
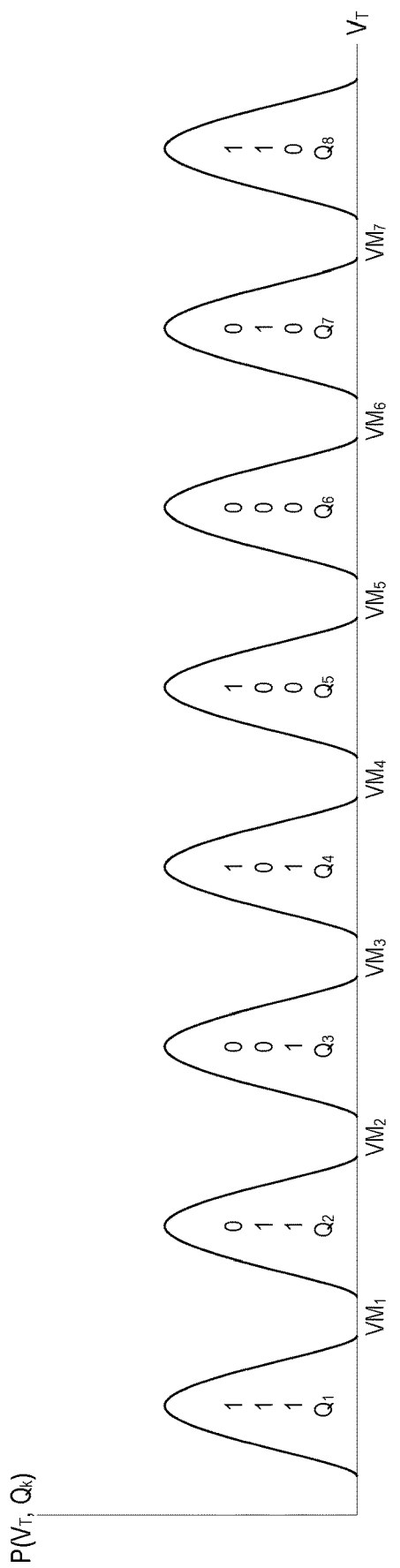
FIG. 3B illustrates an example set of threshold control gate voltage distributions for a memory cell in accordance with some embodiments of the present disclosure.

Depending on its type, a memory cell can be selectively modified to carry one of a sequence of charges $Q_k$, with $1 \leq k \leq 2^N$. The charges $Q_k$ are preferably selected to be sufficiently different from each other, such that any two adjacent voltage distributions $P(V_T, Q_k)$ and $P(V_T, Q_{k+1})$ do not overlap and are separated by a valley margin. That is, $2^N$ distributions $P(V_T, Q_k)$ are interspaced with $2^N-1$ valley margins. The charge state $Q_k$ can be determined during a readout operation by detecting that a control gate voltage $V_{CG}$ within the valley margin $VM_k$ is sufficient to open the cell to the source-drain current whereas a control gate voltage within the preceding valley margin $VM_{k-1}$ is not. Accordingly, a memory cell placed into a $k^{th}$ charge state (i.e., having the charge $Q_k$ deposited on its charge storage node) can be understood as storing a particular combination of N bits (e.g., 0110 for N=4). In this way, the memory cell can function as an N-bit storage unit. By way of example, FIG. 3B illustrates an example set of threshold control gate voltage distributions for a memory cell capable of storing three bits of data by placing the memory cell into at least eight charge states that differ by the amount of charge on the charge storage node (i.e., floating gate) of the memory cell. More particularly, FIG. 3B shows distributions of threshold voltages $P(V_T, Q_k)$ of a memory cell for 8 different charge states $Q_k$ (i.e., $2^3$ charge states) (also referred to as "programming levels") and 7 valley margins $VM_k$ (i.e., with $2^3-1$ valley margins) (also referred to as "read windows"). Memory cells can be classified by the number of bits that they can store. For instance, a single-level cell (SLC) can store one bit of data (N=1), a multi-level cell (MLC) can store up to two bits of data (N=2), a tri-level cell (TLC) can store up to three bits of data (N=3), a quad-level cell (QLC) can store up to four bits of data (N=4), and a penta-level cell (PLC) can store up to five bits of data (N=5).

Figure 4:
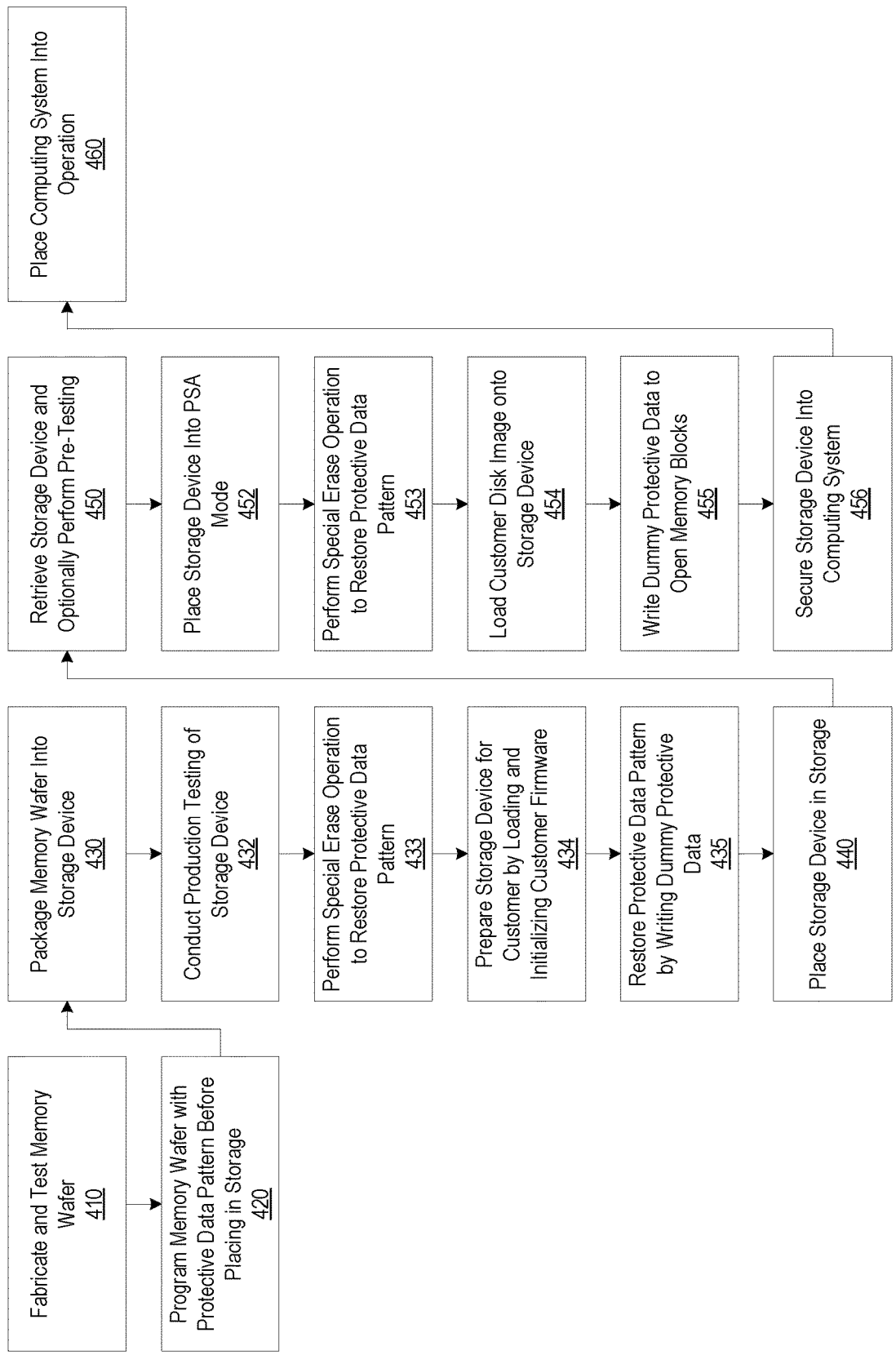
FIG. 4 is a high-level flow diagram of an example production work flow for producing a computing system in accordance with some embodiments of the present disclosure.

FIG. 4 is a high-level flow diagram of an example production work flow 400 for producing a computing system to include a storage device with a memory in accordance with some embodiments of the present disclosure. As illustrated and described below, the production work flow 400 may involve four stages: a memory wafer fabrication stage, a storage device production stage, a computing system production stage, and a post production stage. In order to protect the memory and its cells from damage, a protective data pattern is placed and maintained on the memory throughout the production work flow 400. The production process 400, in particular, may seek to ensure that the memory carries a protective data pattern before entering stages in which the memory may be subjected to high temperatures and/or long periods of storage. In doing so, the production work flow 400 may be able to affect an improvement in the read window budget of the memory device, which in turn, may allow for more aggressive program and erase times and/or improved data retention characteristics. It will be understood that the illustrated embodiments are merely examples, and that the illustrated processes can be performed in a different order, and some processes can be performed in parallel. Additionally, one or more processes can be omitted in various embodiments. Thus, not all processes are required in every embodiment. Likewise, in some embodiments, one or more additional processes may be performed.

The production work flow 400 may begin at operation 410 with the fabrication of a memory wafer, i.e., where an array of memory cells (e.g., a 2D or 3D NAND array) are formed onto a silicon wafer. The memory wafer may undergo testing after its initial fabrication during which the basic operation and functionality of the memory cells is verified and electrical parameters regarding the memory cells is collected. The wafer testing may be performed by a piece of test equipment called a prober, and the process is often referred to as wafer probe (or wafer test). In testing the wafer, the prober may apply one or more test patterns to the memory wafers (e.g., by programming or erasing each of the memory cells to a particular state) and observe the response.

At operation 420, upon completion of wafer testing, the memory wafer can be placed into storage where it will remain until it is needed at the next stage of the production work flow 400. Typically, after all wafer testing has been completed, the memory wafer will carry an "erase" pattern (e.g., its memory cells will be in a TLC Level 0 state). However, in some embodiments of the present disclosure, wafer testing will complete with the memory wafer having a protective data pattern in place. A memory wafer, for example, may end wafer testing with a Solid Level 2 (SL2) pattern in place, i.e., where all memory cells are in a TLC Level 2 state. That is, the charge carried by the memory cells is similar to a Level 2 state of a TLC memory cell. Because the outgoing pattern of the memory wafer is a protective data pattern, damage to its memory cells can be minimized during storage.

The prober, for example, could program the memory to the desired protective state, but a program operation typically can only transition cells one page at a time. The prober, therefore, may employ a "special erase" operation that places the memory cells of an entire block into a state similar to TLC Level 2. Because the special erase operation can be performed block-by-block, an SL2 pattern for the memory device can be realized more efficiently (i.e., when compared to use of a program operation). And, while the threshold voltage distribution affected by the special erase operation may be less precise than a program operation (i.e., resulting in a wider threshold voltage distribution), it is still able to adequately protect the memory cells of the memory device (i.e., in order to realize a desired read window budget improvement).

The production work flow 400 may proceed to a storage device production stage. As part of the storage device production stage, at operation 430, a memory wafer can be packaged into a storage device (e.g., a mNAND package). A memory wafer, for example, may be retrieved from storage and diced to obtain a number of memory dice, one or more of which may be secured to a printed circuit board (PCB) of the storage device, e.g., using an infra-red (IR) reflow soldering process. In securing a memory die to the PCB of the storage device, the memory die can be subjected to high temperatures. However, because the memory die still carries a protective data pattern (e.g., the SL2 pattern is not altered through die formation), damage to the memory cells is minimized.

At operation 432, the storage device may undergo production testing to verify that its memory (i.e. the memory die or dice integrated therein) is functioning properly, after which the storage device may be prepared for delivery to an end-customer, at operation 434. As part of this process, a test system may perform (or initiate) a number of procedures on the storage device that may alter or break the protective data pattern (e.g., SL2 pattern) of the memory. However, in accordance with the present disclosure, in some embodiments, an enhanced production testing flow may be employed that restores the protective data pattern to the memory of the storage device before it proceeds to the next stage of the production work flow 400.

By way of example, as part of production testing, the test system may download a test firmware to the storage device, for example, by writing the test firmware to one or more blocks of the storage device memory (e.g., to one or more blocks of an SLC portion of the storage device memory). The test firmware may be used to test the storage device memory and ensure that it is functioning properly and free of defects. The test system, for instance, may perform (or cause the storage device to perform) a test erase operation to identify defective memory blocks, but the erase operation may break the protective data pattern of the memory. A traditional erase operation, for instance, might place the memory cells into a TLC Level 0 state. Accordingly, at operation 433, upon completion of the memory testing, a special erase operation may be performed, similar to that described above with regard to wafer testing, to place the memory cells of the storage device memory into a protective state (e.g., a TLC Level 2 state).

At operation 434, the storage device may then be prepared for delivery to an end-customer for integration into an end computing system (e.g., a mobile phone). This may involve downloading a customer firmware onto the storage device, initializing the storage device using the customer firmware, and testing the storage device to ensure that the firmware was correctly loaded. The test system, for example, may create (or cause the storage device to create) an L2P mapping, and may load a customer firmware onto the storage device, e.g., by writing the firmware to one or more blocks of the storage device memory. Upon initialization of the storage device using the customer firmware, one or more cursors (e.g., represented by pointers identifying respective locations on the storage device memory where data may be written) may be defined for different memory functions or features supported by the storage device (e.g., dynamic write acceleration (or write boost), replay protected memory block (RPMB), small-block or small-page size, host garbage collection, RPMB garbage collection, etc.). In doing so, the storage device may pre-erase a block of memory for each cursor, which may result in the protective data pattern (e.g., SL2 pattern) of the memory block being replaced with an erase data pattern (e.g., where the memory cells are placed into a Level 0 state).

Accordingly, at operation 435, following successful initialization of the storage device and verification that the customer firmware was properly loaded, the storage device may restore the protective data pattern of the affected memory blocks. The storage device, for example, may be configured to write protective data, for example, "dummy SL2 data" (i.e., non-meaningful data that places the memory cells of the storage device memory into a TLC Level 2 state), to the storage device memory for each cursor that was opened by the firmware during initialization. The storage device, for instance, may be configured to identify a cursor satisfying a cursor definition (e.g., a cursor that was opened and/or utilized by a particular memory feature or function of interest). The storage device may then identify a location on the memory device referenced by the identified cursor and may write protective data to the memory cells at the identified location. The protective data may be written to each memory cell through the last wordline of the block. In some cases, a scramble mode may need to be disabled before the write operation can be performed.

At operation 440, upon completion of the storage device production stage, the storage device may be placed into storage until it is delivered to the end-customer for integration into a computing system (e.g., a mobile phone). Because the outgoing pattern of the storage device memory is a protective data pattern, damage to its memory cells can be minimized during storage.

The production work flow 400 may then proceed to a computing system production stage in which a storage device may be integrated into a computing system (e.g., a mobile phone) by an end-customer. As part of the computing system production stage, a disk image of a customer may be loaded onto the storage device (e.g., using a host controller or test system), which in turn, may be secured to a PCB of the computing system (e.g., using an IR reflow soldering process). In loading the customer disk image onto the storage device, the protective data pattern of the storage device memory may be altered (beyond storing the customer disk image itself), and additional steps may be taken to restore the protective data pattern to as many cells as practicable (i.e., that are not storing customer disk image data) in order to minimize the damage that may be experienced by the memory cells of the storage device when securing the storage device to the computing system PCB.

By way of example, at operation 450, an end-customer may retrieve a storage device from storage and may optionally pre-test the storage device memory to verify that it is functioning properly and free of defects. In doing so, one or more blocks of the storage device memory may be erased and their protective data pattern broken.

At operation 452, the storage device may be placed into a Production State Awareness (PSA) mode (e.g., through the issuance of a PSA START command by a host controller or test system) under which a disk image of the customer may be loaded onto the storage device. The disk image may include software that may be needed for operation of the storage device and/or computing system.

Upon entering PSA mode, at operation 453, the storage device may determine whether any pre-testing had been performed and identifying any memory blocks whose protective data pattern had been broken. The storage device, for example, may examine a memory endurance metric of the memory blocks (e.g., a program-erase count) to identify memory blocks whose protective data pattern may have been broken (e.g., identifying memory blocks having a program-erase count (PEC) greater than 0). If one or more memory blocks were erased through pre-testing, the storage device may perform a special erase operation, similar to that described above with regard to wafer testing and storage device production, to restore the affected memory cells to a protective state.

At operation 454, a customer disk image may be loaded into the storage device memory. This may involve creating an L2P mapping, and loading the customer disk image on the storage device memory, e.g., by writing the image to one or more blocks of the storage device memory. The customer disk image, for example, may be written to an SLC portion of the memory. In some embodiments, the customer disk image may be written to one or more dynamic and/or static blocks of the memory. The static blocks may be relatively more resilient (i.e., than the dynamic blocks), and default routines (e.g., power-on-reset (POR) routines) may be used to erase and write the static blocks. For dynamic blocks, optimized PSA erase and write routines may be loaded via a media-local-bus interface (MLBi) (e.g., from a host controller or test system), with the erase operation being performed when a new block is opened. The PSA write routine may place the memory cells into a state that is closer to their neutral threshold voltage (e.g., as compared to a default write operation), which may minimize the amount of stress placed on the memory cells (e.g., during an IR reflow soldering process). In some embodiments, the PSA erase and write routines may be used for both static and dynamic blocks. The dynamic and/or static blocks may be read back once written, for example, to verify that they were written correctly.

Because the customer disk image may not result in data being written to the end of each block, once the customer disk image has been loaded and a PSA END command is received (e.g., from a host controller or test system), protective data, for example, "dummy SL2 data" (i.e., non-meaningful data that places the memory cells into a TLC Level 2 state), may be written to the unused memory pages of the memory block (as part of operation 455). The protective data may be written up to the last wordline of each incomplete block. In some embodiments, protective data may be written to unused memory pages of certain memory blocks. For example, as discussed above, in some embodiments, the customer disk image may be written to one or more dynamic and/or static memory blocks. The static blocks may be relatively more resilient, and so in some embodiments, protective data may only be written to the unused memory pages of the dynamic blocks. The customer disk image data may be read back after the protective data is written, for example, to verify that the customer disk image data was not altered.

In some embodiments, the computing system production stage may be further improved by changing the erase routine used in the PSA mode generally. A typical erase operation (e.g., a TLC erase operation), for example, may place memory cells into a deep erase state (e.g., TLC Level 0 state). Memory cells in this state may sustain relatively more damage than a shallower erase operation, so a shallower erase operation (e.g., an SLC erase operation, which places a memory cell into a SLC Level 0 state) may be performed instead. The shallower erase operation may afford some level of protection, and a read budget window gain similar to that provided by a TLC Level 2 state may be realized.

At operation 456, the storage device may be secured to the computing system PCB, e.g., using an IR reflow soldering process. Because most of the memory cells of the storage device carry a protective data pattern, damage to the memory cells is minimized. Furthermore, while certain cells may carry the customer disk image data, this data may be written to an SLC portion of the storage device memory, which is relatively more resilient (e.g., as compared to TLC memory cells). When the storage device is next initialized, the customer disk image data may be moved from the SLC portion of the storage device memory to a TLC portion of the storage device memory (e.g., as part of a garbage collection process performed by the storage device).

Once the storage device is secured to the PCB board of the computing system, the process may enter a post-production stage, at operation 460, in which the computing system may be placed into service. Because the storage device memory maintained a protective data pattern throughout the production work flow, the damage experienced by its memory cells may have been minimized and it may possess a relatively larger read window budget. The larger read window budget may allow for more aggressive programming and erase times and/or improved data retention characteristics, as well as other performance improvements that can be derived from an improved read window budget.

Figure 5:
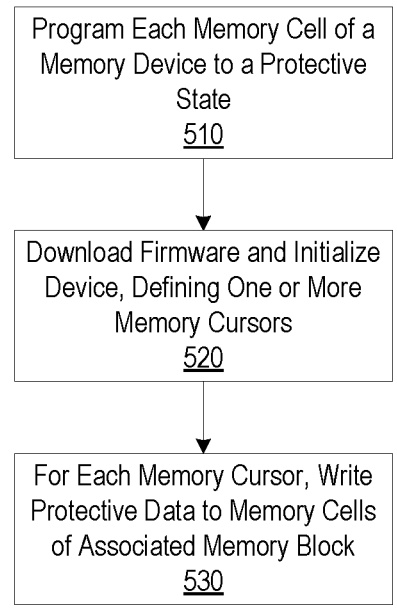
FIG. 5 is a flow diagram of an example method for placing and maintaining a protective data pattern during production of a storage device in accordance with some embodiments of the present disclosure.

FIG. 5 is a flow diagram of an example method 500 for placing and maintaining a protective data pattern on a storage device memory during production of a storage device in accordance with some embodiments of the present disclosure. The method can be performed using processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 can be performed by the data pattern management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic may place a protective data pattern to the memory cells of a memory device, for example, as part of a storage device production process. The processing logic, for example, may perform a special erase operation on each block of a memory device, which may place the memory cells of each block into a protective state (e.g., a TLC Level 2 state). In performing the special erase operation, the processing logic may be able to restore a protective data pattern to the memory device. The special erase operation, for example, may restore a protective data pattern (e.g., an SL2 data pattern) that may have been broken through the performance of a traditional erase operation, e.g., where each block of the memory cell is placed into a deep erase state (e.g., TLC Level 0 state). The traditional erase operation may have been performed as part of a storage device production testing procedure, for example, to ensure that the storage device memory is functioning properly and free of defects (e.g., free of defective memory blocks).

At operation 520, a device firmware may then be loaded onto the storage device, and the storage device memory may be initialized using the device firmware. The processing logic, for example, may build an L2P mapping table for the memory device (i.e., that maps the memory blocks of the memory device to one or more logical blocks) and download a firmware to the memory device by writing firmware data to one or more logical blocks. A customer firmware, for example, may be downloaded to the storage device in preparing the storage device for delivery to an end-customer for integration into an end computing system (e.g., a mobile phone).

The device may then be initialized (or "booted up") using the downloaded firmware. In doing so, the processing logic may define one or more cursors, identifying locations on the memory device where data may be written. The processing logic, for example, may define one or more cursors for different functions or features of the storage device memory supported by the firmware (e.g., dynamic write acceleration (or write boost), replay protected memory block (RPMB), small-block or small-page size, host garbage collection, RPMB garbage collection, etc.). The processing logic, for example, may define the cursors as part of a firmware test procedure, e.g., to ensure that the firmware had been correctly loaded. In defining the cursors, the processing logic may perform a pre-erase operation that erases a logical block of memory for each cursor (e.g., placing the memory cells of the logical block to a Level 0 state).

At operation 540, the processing logic may restore a protective data pattern to the memory device, which may have been broken through the device initialization (and cursor definition) process. The processing logic, for example, may write protective data, for example, dummy SL2 data (i.e., non-meaningful data that places the memory cells of the storage device memory into a TLC Level 2 state), to the memory block associated with each cursor that was opened. The processing logic, for instance, may identify a cursor satisfying a cursor definition (e.g., a cursor that was opened and/or utilized by a particular memory feature or function of interest). The storage device may then identify a location on the memory device referenced by the identified cursor and may write protective data to the memory cells at the identified location. The protective data may be written to each memory cell through the last wordline of the block. With the protective data pattern restored, the storage device may be safely placed into storage, for example, until it is delivered to an end-customer for integration into a computing system (e.g., a mobile phone).

Figure 6:
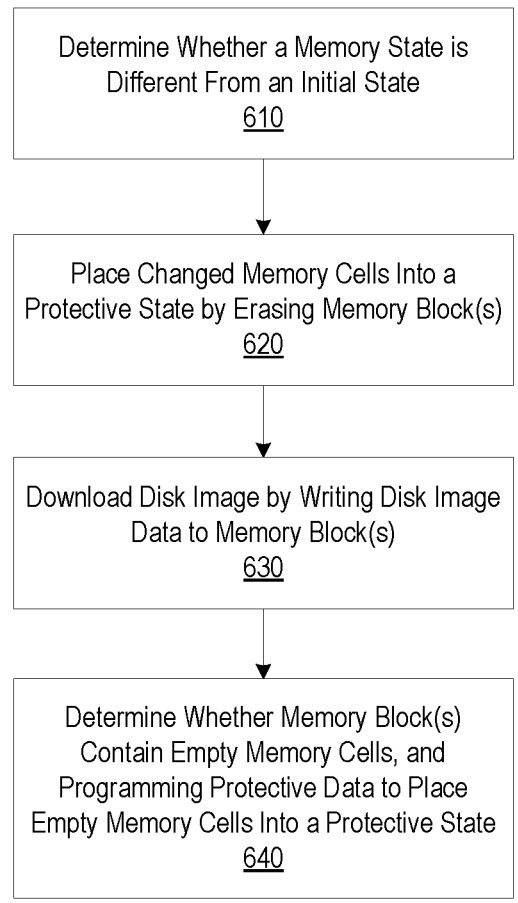
FIG. 6 is a flow diagram of an example method for placing and maintaining a protective data pattern during production of a computing system in accordance with some embodiments of the present disclosure.

FIG. 6 is a flow diagram of an example method 600 for placing and maintaining a protective data pattern on a storage device memory during production of a computing system in accordance with some embodiments of the present disclosure. The method can be performed using processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 can be performed by the data pattern management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The production of a computing system may involve the integration of a storage device that includes a storage device memory. As part of the computing system production, a disk image may be loaded onto the storage device, which may then be secured to a PCB of the computing system (e.g., using an IR reflow soldering process). Before the disk image is loaded and the storage device is secured, the processing logic may pre-test the storage device memory (i.e., before loading the disk image) to verify that it is functioning properly and free of defects. In doing so, the processing logic may erase one or more blocks of the storage device memory, which may break a protective data pattern of the storage device memory.

Accordingly, at operation 610, the processing logic may determine whether a state of the storage device memory is different (e.g., has been changed from an initial state (e.g., has been changed) from an initial state when it completed storage device production). The processing logic, for example, may examine a memory endurance metric of each memory block of the storage device memory (e.g., a program-erase count) and identify each memory block that may be in a different state (e.g., having a program-erase count greater than 0).

At operation 620, the processing logic may restore the protective data pattern (e.g., an SL2 pattern) to the storage device memory before loading the disk image. The processing logic, for example, may place the changed memory cells back into a protective state (e.g., a TLC Level 2 state) by performing a special erase operation on the memory blocks that were identified as having changed.

At operation 630, the processing logic may download a disk image (e.g., a customer disk image) to the storage device memory by writing disk image data to one or more memory blocks. In some embodiments, the processing logic may first place the storage device into a Production State Awareness (PSA) mode (e.g., through the issuance of a PSA START command) before the disk image is loaded. In loading the disk image onto the storage device, the processing logic may create an L2P mapping that maps the memory blocks of a storage device memory to corresponding logical blocks. The processing logic may then download a disk image (e.g., of a customer) to the storage device memory by writing disk image data to one or more logical blocks. The disk image, for example, may be written to an SLC portion of the memory. In some embodiments, the customer disk image may be written to one or more dynamic and/or static blocks of the storage device memory. The static blocks may be relatively more resilient (i.e., than the dynamic blocks), and the processing logic may use default routines (e.g., power-on-reset (POR) routines) to erase and write the static blocks. For dynamic blocks, the processing logic may load optimized PSA erase and write routines via a media-local-bus interface (MLBi) (e.g., from a host controller or test system), with the processing logic performing the erase operation when a new dynamic block is opened. The PSA write routine may place the memory cells into a state that is closer to their neutral threshold voltage (e.g., as compared to a default SLC write operation), which may minimize the amount of stress placed on the memory cells (e.g., during a IR reflow soldering process). In some embodiments, the processing logic may perform PSA erase and write routines for both static and dynamic blocks. The processing logic may also read back the dynamic and/or static blocks once written, for example, to verify that they were written correctly.

At operation 640, the processing logic may determine whether the memory blocks containing disk image data contain any unused memory pages, and may place the unused memory pages into a protective state by programming dummy protective data (i.e., non-meaningful data that places the memory cells into a protected state) to the unused memory pages. By way of example, in loading the disk image to the storage device memory, data may not be written to the end of each memory block (i.e., to the end of each static and/or dynamic memory block). Accordingly, upon completion of the disk image loading process (e.g., upon issuance of a PSA END command), the processing logic may determine which memory blocks are incomplete (i.e., which contain unused memory pages without disk image data). The processing logic may then program dummy protective data (e.g., dummy SL2 data) to the unused memory pages to complete the memory block. The protective data may be written up to the last wordline of each incomplete block. In some embodiments, the processing logic may program protective data to unused memory pages of certain memory blocks. For example, as discussed above, in some embodiments, the processing logic may write the customer disk image to one or more dynamic and/or static memory blocks. The static blocks may be relatively more resilient, and so in some embodiments, the processing logic may only program protective data to the unused memory pages of the dynamic blocks. The processing logic may also read back the disk image data once the protective data is written, for example, to verify that the disk image data was not altered.

With the protective data pattern in place, the storage device may be safely integrated into the computing system (e.g., by securing the storage device to a PCB of the computing system using an IR reflow soldering process). Because most of the memory cells of the storage device carry a protective data pattern, damage to the memory cells is minimized. Furthermore, while certain memory cells may carry disk image data, this data may be written to an SLC portion of the storage device memory, which is relatively more resilient (e.g., as compared to TLC memory cells). When the storage device is next initialized, the processing logic may move the disk image data from the SLC portion of the storage device memory to a TLC portion of the storage device memory (e.g., as part of a garbage collection process).

Figure 7:
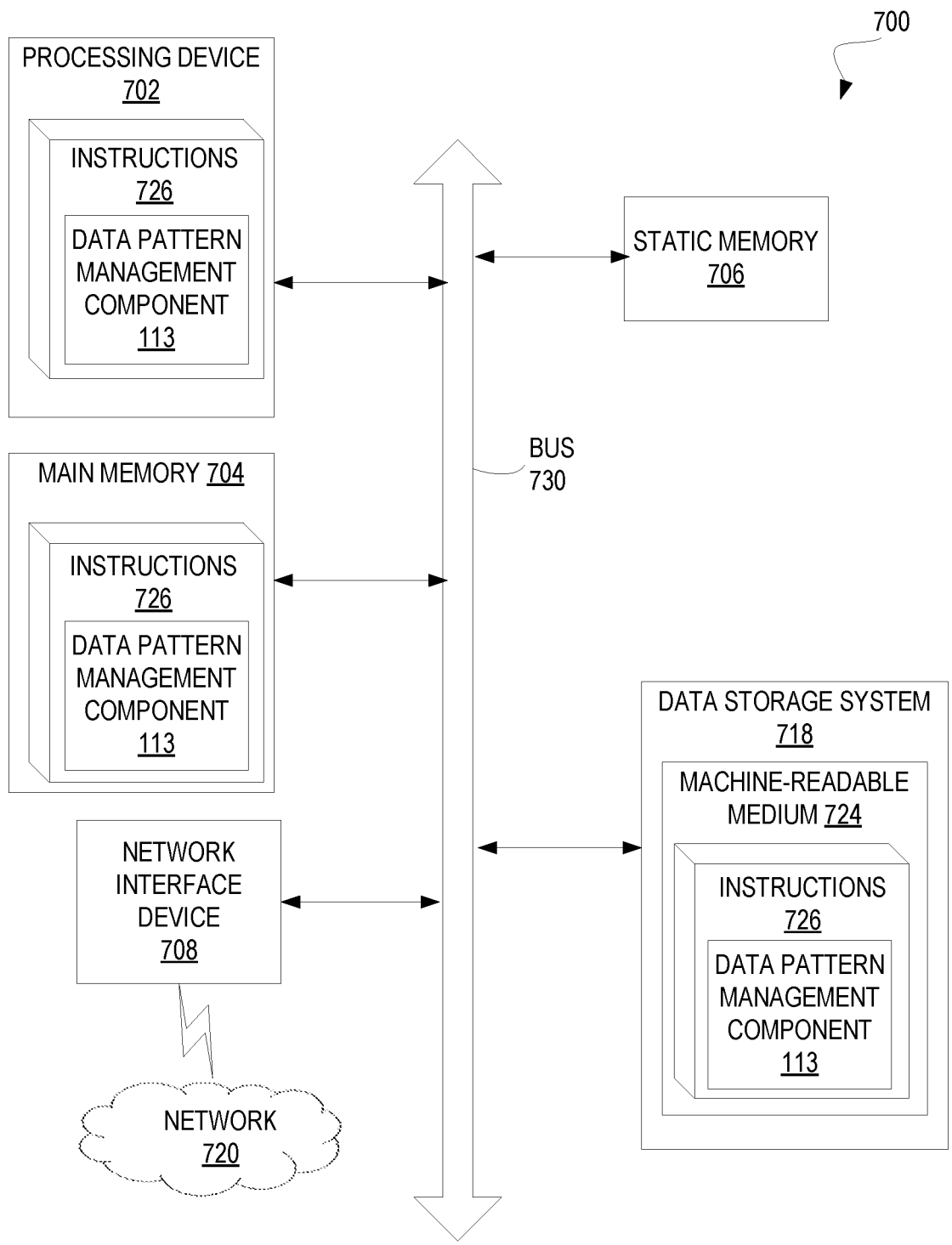
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the data pattern management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a data pattern management component (e.g., the data pattern management component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a memory device including a plurality of management units; and
    a processing device, operatively coupled with memory device, to perform operations comprising:
        placing the plurality of management units into a first protective state by erasing the plurality of management units;
        identifying a cursor satisfying a cursor definition;
        identifying a subset of the plurality of management units based on a location on the memory device referenced by the cursor; and
        placing a selected management unit of the subset of the plurality of management units into a second protective state by programming a protective data pattern to the selected management unit.

2. The system of claim 1, wherein the first protective state and the second protective state are characterized by a triple level cell (TLC) Level 2 state.

3. The system of claim 1, wherein the processing device is to further perform operations comprising:
    placing one or more management units of the plurality of management units into an unprotective state.

4. The system of claim 3, wherein the one or more management units of the plurality of management units are placed into the unprotective state by erasing the one or more management units of the plurality of management units to a TLC Level 0 state.

5. The system of claim 1, wherein the processing device is to further perform operations comprising:
    creating a logical-to-physical mapping table comprising a plurality of records, each record mapping one of the plurality of management units to a corresponding logical address.

6. The system of claim 5, wherein the processing device is to further perform operations comprising:
    storing a device firmware to one or more of the plurality of management units;
    defining one or more new cursors, each of the new cursors referencing a corresponding location, on the memory device, of a corresponding subset of the plurality of management units; and
    placing the corresponding subset of the plurality of management units referenced by each of the one or more new cursors into an unprotective state by erasing the corresponding subset of the plurality of management units.

7. The system of claim 6, wherein each of the one or more new cursors is utilized by a function supported by the device firmware.

8. A method comprising:
    determining whether a state of each of a plurality of management units is different from an initial state;
    placing the management units having a changed state into a first protective state;
    storing a disk image to one or more management units of the plurality of management units;
    determining whether any of the one or more management units containing the disk image contain unused memory pages; and
    placing the unused memory pages into a second protective state.

9. The method of claim 8, wherein the first protective state and the second protective state are characterized by a TLC Level 2 state.

10. The method of claim 8, wherein placing the management units having a changed state into a first protective state comprises:
   erasing, into the first protective state, the management units having a changed state.

11. The method of claim 8, wherein placing the unused memory pages into the second protective state comprises:
   programming a protective data pattern to the unused memory pages.

12. The method of claim 8, wherein determining whether a state of each of a plurality of management units has changed from an initial state comprises:
   determining whether a memory endurance metric satisfies a threshold criteria.

13. The method of claim 11, wherein programming the protective data pattern places the unused memory pages into a TLC level 2 state.

14. A non-transitory computer-readable storage medium comprising instructions that, when executed by a processing device, cause the processing device to perform operations comprising:
   placing a plurality of management units of a memory device into a first protective state by erasing the plurality of management units;
   identifying a cursor satisfying a cursor definition;
   identifying a subset of the plurality of management units based on a location on the memory device referenced by the cursor; and
   placing a selected management unit of the subset of the plurality of management units into a second protective state by programming a protective data pattern to the selected management unit.

15. The non-transitory computer-readable storage medium of claim 14, wherein the first protective state and second protective state are characterized by a TLC Level 2 state.

16. The non-transitory computer-readable storage medium of claim 14, wherein the processing device is to perform operations further comprising:
   placing one or more management units of the plurality of management units into an unprotective state.

17. The non-transitory computer-readable storage medium of claim 16, wherein the one or more management units of the plurality of management units are placed into the unprotective state by erasing the one or more management units of the plurality of management units to a TLC Level 0 state.

18. The non-transitory computer-readable storage medium of claim 14, wherein the processing device is to perform operations further comprising:
   creating a logical-to-physical mapping table comprising a plurality of records, each record mapping one of the plurality of management units to a corresponding logical address.

19. The non-transitory computer-readable storage medium of claim 18, wherein the processing device is to perform operations further comprising:
   storing a device firmware to one or more of the plurality of management units;
   defining one or more new cursors, each of the new cursors referencing a corresponding location, on the memory device, of a corresponding subset of the plurality of management units; and
   placing the corresponding subset of the plurality of management units referenced by each of the one or more new cursors into an unprotective state by erasing the corresponding subset of the plurality of management units.

20. The non-transitory computer-readable storage medium of claim 19, wherein each of the one or more new cursors is utilized by a function supported by the device firmware.

* * * * *